United States Patent [19]

Hashizume et al.

[11] Patent Number: 5,513,278
[45] Date of Patent: Apr. 30, 1996

[54] HANDWRITTEN CHARACTER SIZE DETERMINATION APPARATUS BASED ON CHARACTER ENTRY AREA

[75] Inventors: Tatsuo Hashizume, Morigushi; Hiroyuki Sasaki, Ibaraki; Hideki Shitanda, Osaka; Norio Nakamura, Neyagawa, all of Japan

[73] Assignee: Matsushita Electric Industrial Co., Ltd., Osaka, Japan

[21] Appl. No.: 249,879

[22] Filed: May 26, 1994

[30] Foreign Application Priority Data

May 27, 1993 [JP] Japan ..................... 5-126211

[51] Int. Cl.⁶ ..................................... G06K 9/00
[52] U.S. Cl. ................ 382/187; 382/301; 345/143; 395/150
[58] Field of Search ................. 382/13, 40, 47, 382/61, 19, 25, 26, 187, 195, 203, 204, 229, 286, 298, 301; 395/102, 110, 150, 151; 345/143, 194, 195

[56] References Cited

U.S. PATENT DOCUMENTS

| | | | |
|---|---|---|---|
| 3,613,080 | 10/1971 | Angeloni, Sr. et al. | 340/146.3 AC |
| 3,676,847 | 7/1972 | Partin | 340/146.3 AC |
| 3,992,697 | 11/1976 | Knab et al. | 340/146.3 MA |
| 4,987,603 | 1/1991 | Ohnishi et al. | 382/25 |
| 5,151,951 | 9/1992 | Ueda et al. | 382/19 |

FOREIGN PATENT DOCUMENTS

| | | | |
|---|---|---|---|
| 0114249 | 8/1984 | European Pat. Off. | 382/19 |
| 0206829 | 12/1986 | European Pat. Off. | 382/13 |
| 61-194582 | 8/1986 | Japan | 382/13 |
| 62-247485 | 10/1987 | Japan | 382/13 |
| 63-95590 | 4/1988 | Japan | 382/13 |
| 4-592 | 1/1992 | Japan | 382/13 |
| 4-290184 | 10/1992 | Japan | G06K 9/00 |

OTHER PUBLICATIONS

Translation of Japanese No. 62–247485.
Translation of Japanese No. 4–290184.
Translation of Japanese No. 61–194582.
Translation of Japanese No. 63–95590.
Translation of Japanese No. 4–592.

Primary Examiner—Leo Boudreau
Assistant Examiner—Andrew W. Johns
Attorney, Agent, or Firm—Price, Gess & Ubell

[57] ABSTRACT

When a handwritten character is inputted with a pen of a pen input device, a handwritten character recognition unit recognizes the character according to coordinate data of the character. Also, a handwritten area judge unit judges the size of the character and a blank area according to a range of preset areas passed though the handwriting. A character font determination unit detects a character font from a plurality of character fonts to correspond to the character size judged by the handwritten area judge unit. The determined character font is outputted to a display device and the like.

10 Claims, 10 Drawing Sheets

Fig. 9 area data

| character area | divided area | | | |
|---|---|---|---|---|
| | 1 | 2 | 3 | 4 |
| 33a | 1 | 1 | 1 | 1 |
| 33b | 1 | 0 | 0 | 1 |
| 33c | 0 | 0 | 0 | 1 |
| 33d | 0 | 0 | 0 | 0 |

Fig. 10 character size judge table

| divided area | | | | character size |
|---|---|---|---|---|
| 1 | 2 | 3 | 4 | |
| 1 | 0 | 0 | 0 | standard (1×1) |
| 0 | 1 | 0 | 0 | |
| 0 | 0 | 1 | 0 | |
| 0 | 0 | 0 | 1 | |
| 1 | 0 | 0 | 1 | vertically double size (2×1) |
| 0 | 1 | 1 | 0 | |
| 1 | 1 | 0 | 0 | horizontally double size (1×2) |
| 0 | 0 | 1 | 1 | |
| 1 | 1 | 1 | 1 | double size (2×2) |

HANDWRITTEN CHARACTER SIZE DETERMINATION APPARATUS BASED ON CHARACTER ENTRY AREA

BACKGROUND OF THE INVENTION

1. Field of the Invention

The present invention relates to a handwritten character input device for recognizing a handwritten character, and setting a character font to correspond to the recognized character.

2. Description of the Related Art

Recently, a handwritten character input device for recognizing handwritten characters, and inputting the recognized characters has been widely used for example in a word processor to enable the inputting of characters with a stylus pen.

The major construction of the conventional handwritten character input device is described as referring to FIG. 1. The handwritten character input device in FIG. 1 comprises a handwritten character input unit 121 for inputting a character to a word processor with a pen, a handwritten character recognition unit 122 for recognizing the handwritten character, a character code generation unit 123 for generating a character code for the character recognized by the handwritten character recognition unit 122, and a character input unit 124 for inputting the character of the character code generated by the character code generation unit 123 to the word processor according to a preset font.

The operation of the conventional handwritten character input device thus constructed is described now.

(1) To input a character to a word processor, the user handwrites a character to the handwritten character input unit 121 with a pen.

(2) The handwritten character code recognition unit 122 recognizes the handwritten character.

(3) The character code generation unit 123 generates a character code for the character recognized by the handwritten character code recognition unit 122.

(4) The character input unit 124 inputs the character of the character code generated by the character code generation unit 123.

An example of the character inputting operation described hereinabove is described as referring to FIG. 2. FIG. 2 shows an exemplary process of inputting a character to a word processor with the conventional handwritten character input device.

As shown in FIG. 2C, a text to be inputted to the word processor is edited on a main window 130, and a character is handwritten on a sub-window 131 which is constructed with a part of the main window 130. An input frame 132 to be written a character with a pen is formed on the sub-window 131. When a determination button is pressed, the character displayed on the sub-window 131 is determined, and the determined character is inputted onto the main-window 130, after a character cursor 134.

The operation will be described in order.

(1) As shown in FIG. 2A, the operator handwrites a character within the input frame 132 of the sub-window 131 with a pen.

(2) In turn, the handwritten character code recognition unit 122 recognizes "B", "M", and "S".

(3) The character code generation unit 123 generates character codes "code x", "code y", and "code z" for the recognized characters "B", "M", and "S" respectively, and displays each of them within the input frame, as shown in FIG. 2B.

(4) When the determination button 133 is pressed to determine the characters which have been inputted to the sub-window 131, the character input unit 124 inputs the character of each character code generated by the character code generation unit 123 according to a preset font onto the main-window, as shown in FIG. 2C.

As mentioned hereinabove, the conventional handwritten character input device applies a single size to every character, that is, it inputs the same font of characters regardless of the character size written by the operator. For this reason, to change the character size, designation of the character whose character size is to be changed and selection of a desired character font to be applied to the designated character must be conducted with an edition screen of the word processor. This reduces the favorable feature of the handwritten character input device which is capable of inputting character data easily as if the character were written on a paper.

SUMMARY OF THE INVENTION

Accordingly, it is an object of the present invention to provide a handwritten character input device capable of selecting a character font which reflects size of a handwritten character without an operator's additional font designation operation.

The above object is accomplished by a handwritten character input device comprising an input unit for inputting coordinate data which represents the operator's handwriting within a preset character input coordinate system, a character recognition unit for recognizing the type of a character according to the coordinate data and generating a character code for the character, a character size determination unit for determining the size of the character according to a range of the handwritten character in the character input coordinate system, a character font generation unit for generating a character font according to the character code recognized by the character code recognition unit and the character size determined by the character size determination unit.

With the handwritten character input device, the size of a character area into which a character is handwritten for instance with a pen of an input device is automatically determined, and a character font corresponding to the size of the handwritten character is selected. Accordingly, by employing the handwritten character input device in a word processor, the inputting of a character in accordance with the size of the character handwritten by the user is realized, which therefore the inputting operation of handwritten characters is reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 9 shows exemplary area data employed by a handwritten character area judge unit in the handwritten character input device of the present invention;

FIG. 10 shows an exemplary character size judge table employed by the character area judge unit in the handwritten character input device of the present invention;

DESCRIPTION OF THE PREFERRED EMBODIMENT

Figure 1:
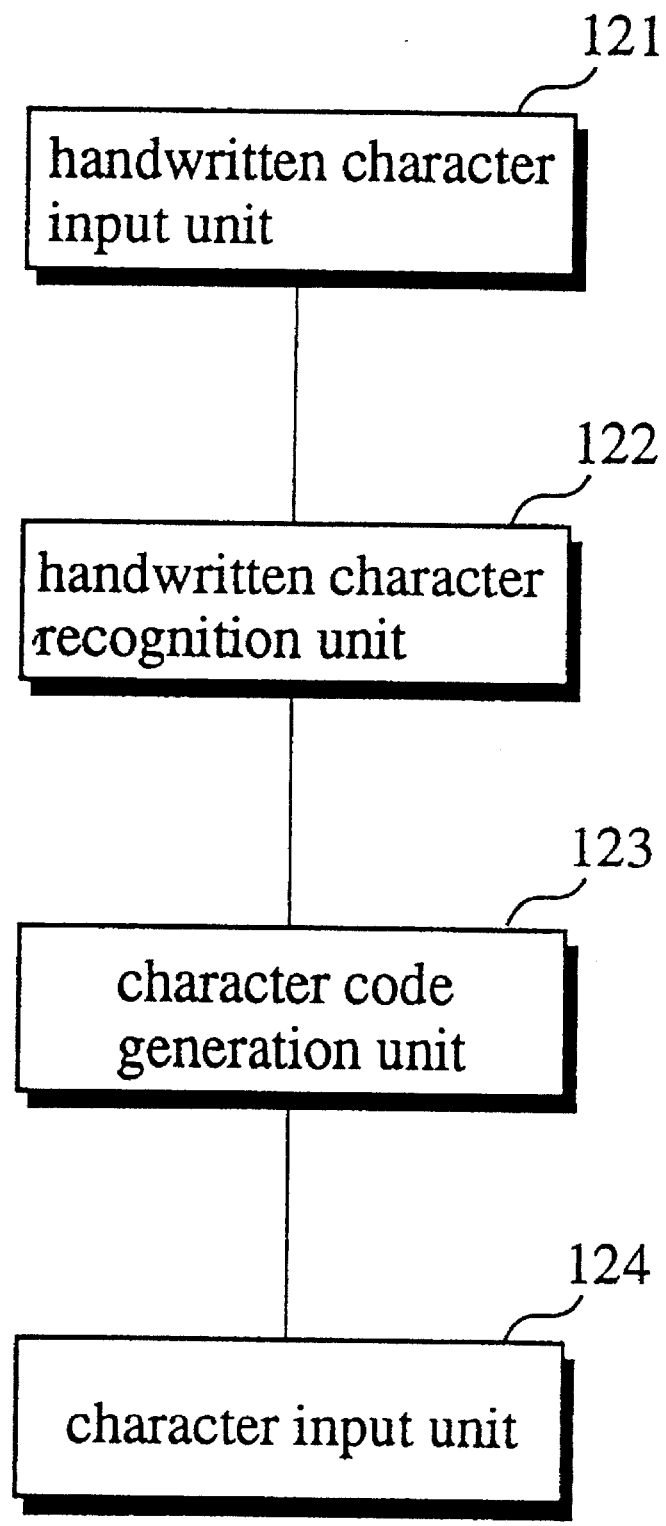
FIG. 1 shows the major configuration of a conventional handwritten character input device.
Figure 2A:
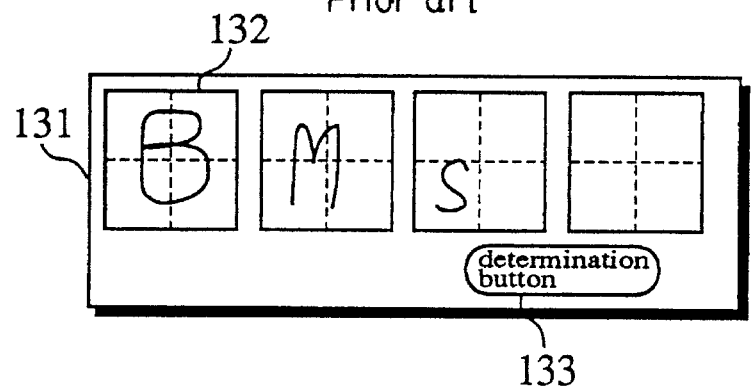
FIG. 2A, 2B, and 2C shows display screens for inputting of characters with the conventional handwritten character input device.
Figure 2B:
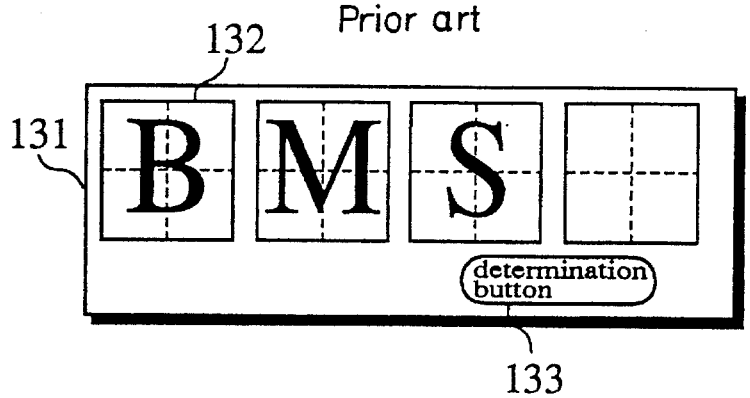
Figure 2C:
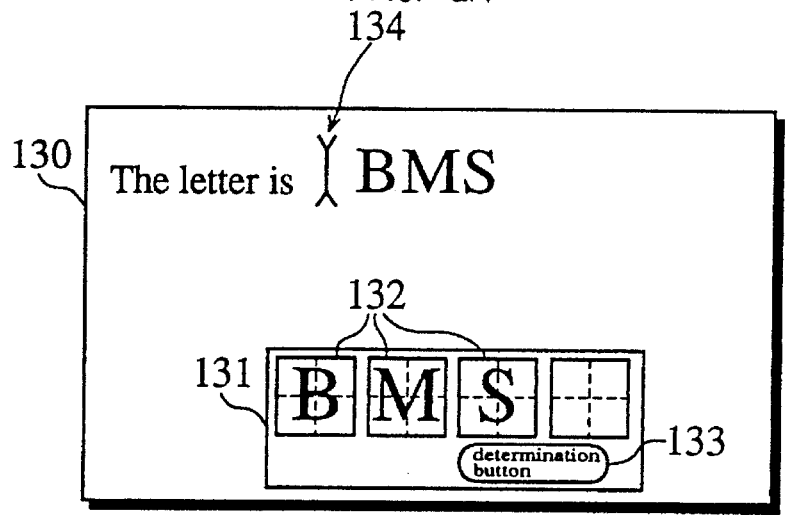
Figure 3:
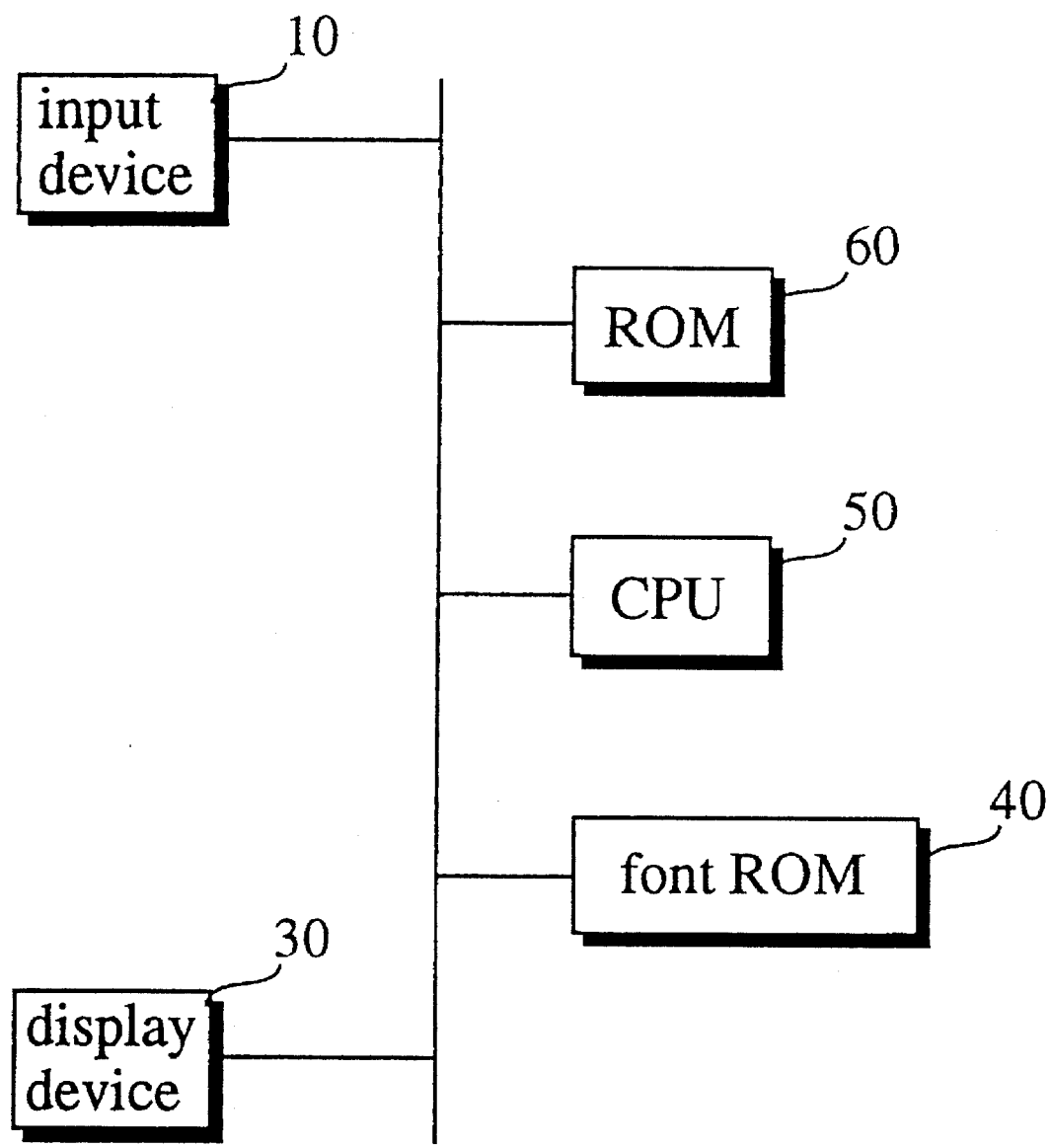
FIG. 3 shows the hardware configuration of a handwritten character input device of the present invention.
Figure 4:
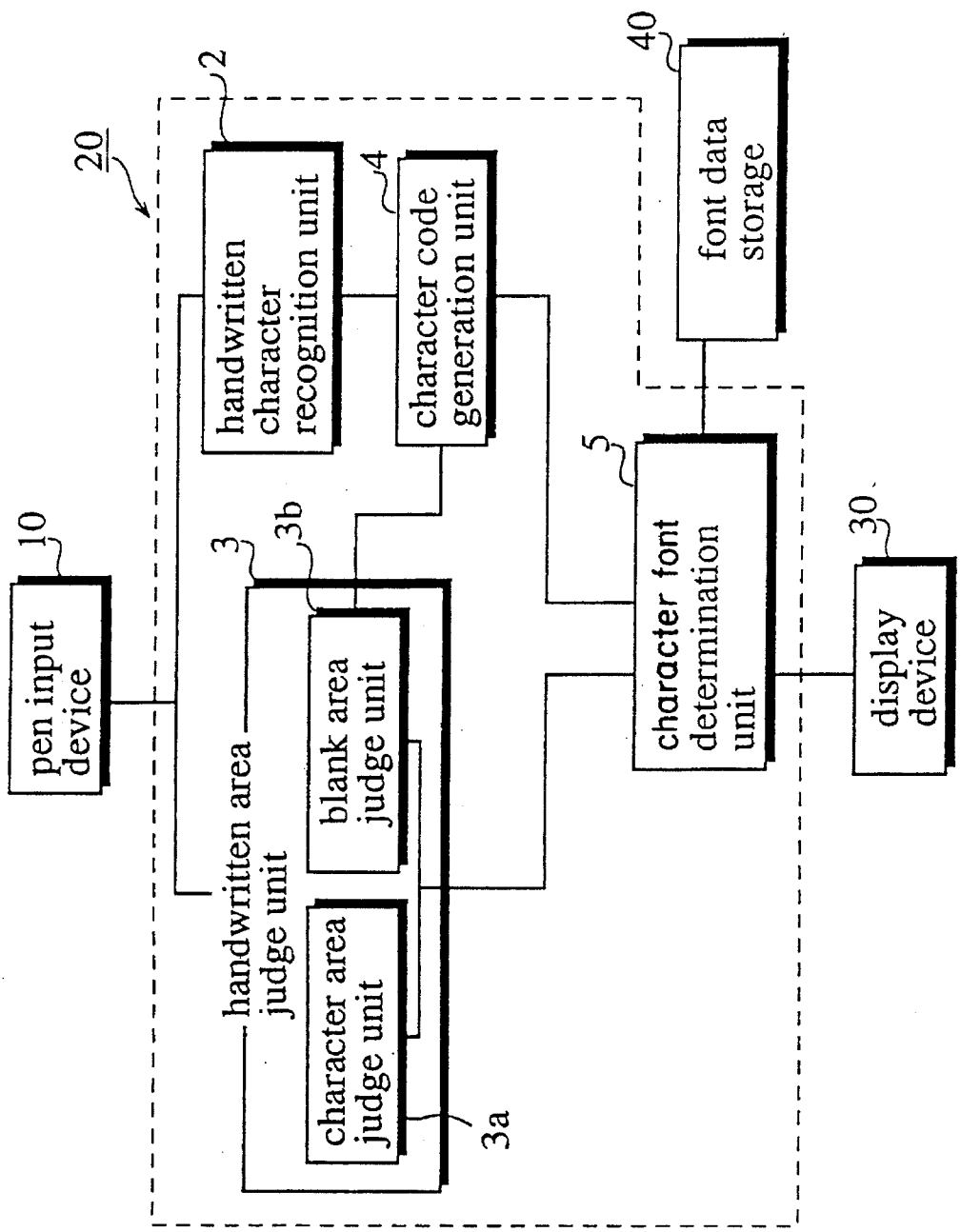
FIG. 4 is a block diagram describing function of the handwritten character input device in an embodiment of the present invention.

A handwritten character input device in an embodiment of the present invention is connected to a data processing device for processing character data, such as a word processor and a computer, or is embedded in the same. FIG. 3 shows the hardware configuration of the handwritten character input device embedded in the data processing device. As shown in FIG. 3, the handwritten character input device comprises an input device 10, a display device 30, a font ROM 40 for storing font information employed to display characters, an ROM 60 for storing a character recognition program which is operated to recognize handwritten characters, and a CPU 50 for operating the character recognition program. In addition, the display device 30 may be substituted by the display device embedded in the data processing device.

Figure 5:
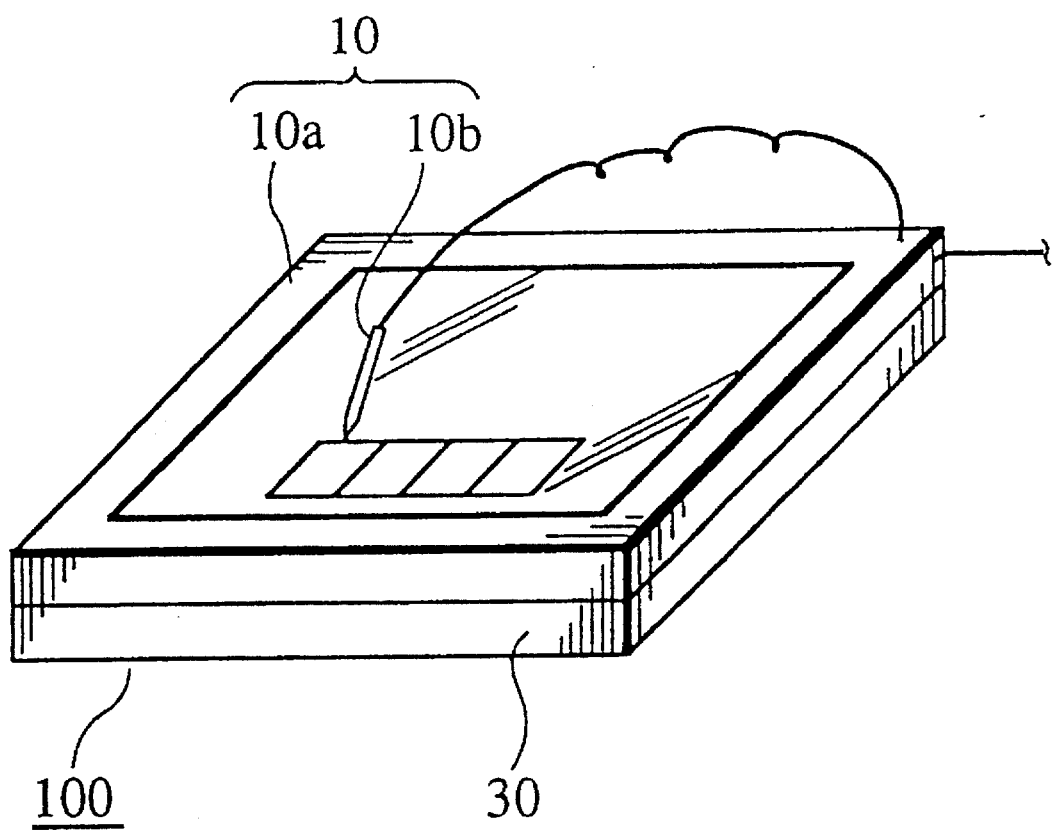
FIG. 5 shows a liquid crystal table device as an example of the handwritten character input device in FIG. 4.

As shown in FIG. 5, a tablet device comprising a tablet plate 10a and a pen 10b is employed as the input device 10. When an operator handwrites a character on the top surface of the table plate 10a with the pen 10b, the tablet plate 10a generates coordinate data representing the character. Various devices using magnetic induction or piezo-electric properties can be employed as the tablet device.

Also, as the display device 30, a device possessing a display screen, such as a CRT or liquid crystal display, can be employed; preferably, a so-called liquid crystal display device is employed where the tablet unit and the liquid crystal display are integrally laminated one on the other.

The font ROM 40 stores font data which is specified by the character code and the character size.

The ROM 60 stores the character recognition program which is operated to recognize a character. The character recognition program is retrieved and executed by the CPU 50 at all times. The operation of the handwritten character input device according to the character recognition program will be described as referring to FIGS. 3–12. It is assumed herein that characters are inputted to a word processor. To be noted, the handwritten character input device starts to operate upon the selection of a handwritten character input mode in the word processor.

Figure 6:
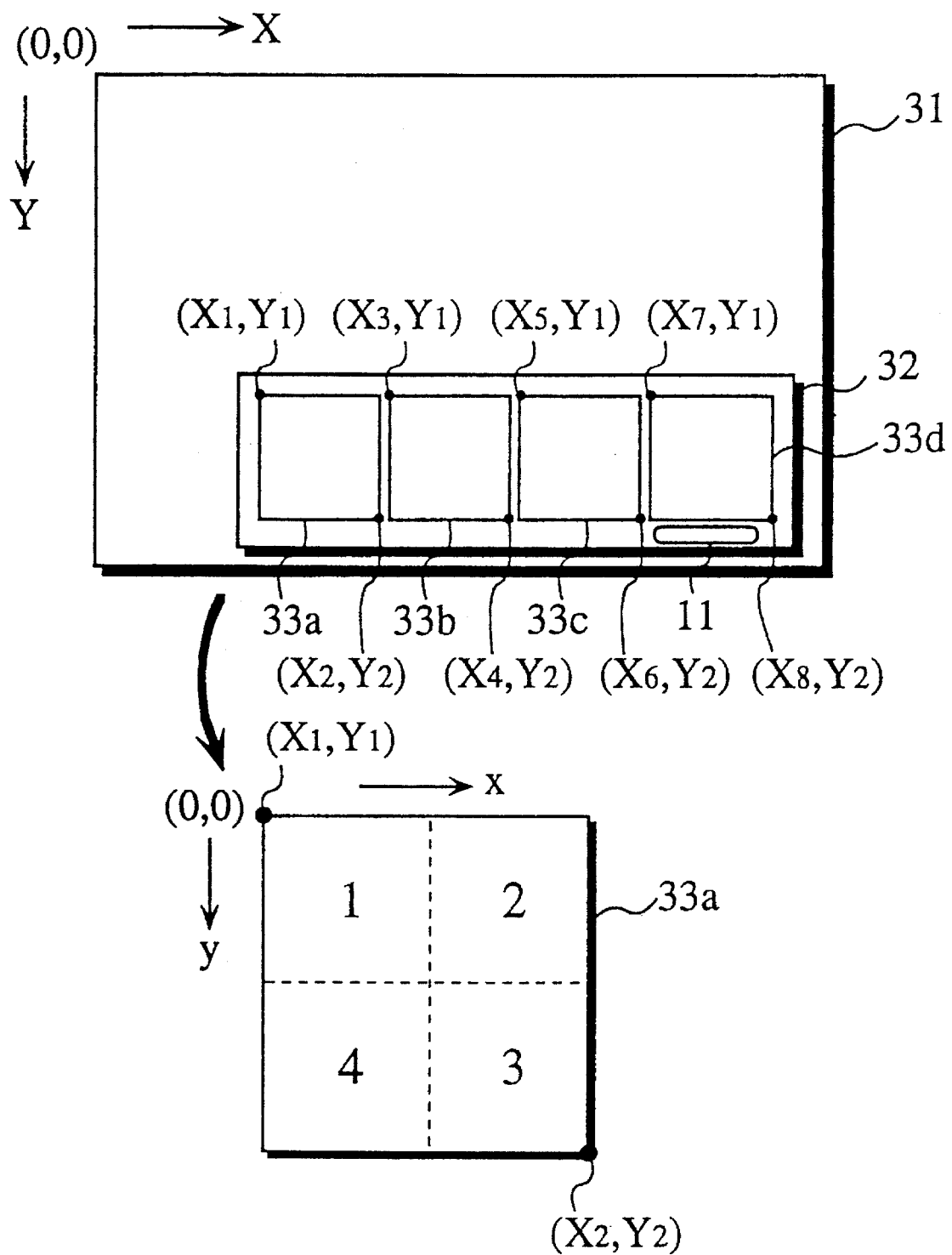
FIG. 6 shows an exemplary display screen when characters are inputted with the handwritten character device of the present invention.

As shown in FIG. 6, a main window 31 for displaying a string of recognized characters and a sub-window 32 for displaying the inputting of a handwritten character in real time are generated in a display screen of the display device 30. An X-Y coordinate system whose origin is the upper left corner of the window area is generated on the main window 31; and an xy coordinate whose origin is (X1,Y1) of the above X-Y coordinate system is generated on the sub-window 32. Further, a plurality of single character input areas 33a–33d are generated within the sub-window 32. Each single character input area, for example 33a is divided into four sub-areas 1, 2, 3, and 4, and coordinates representing each sub-area are stored.

Once the above initialization operations are completed, it is ready to accept the inputting of handwritten characters.

Figure 7:
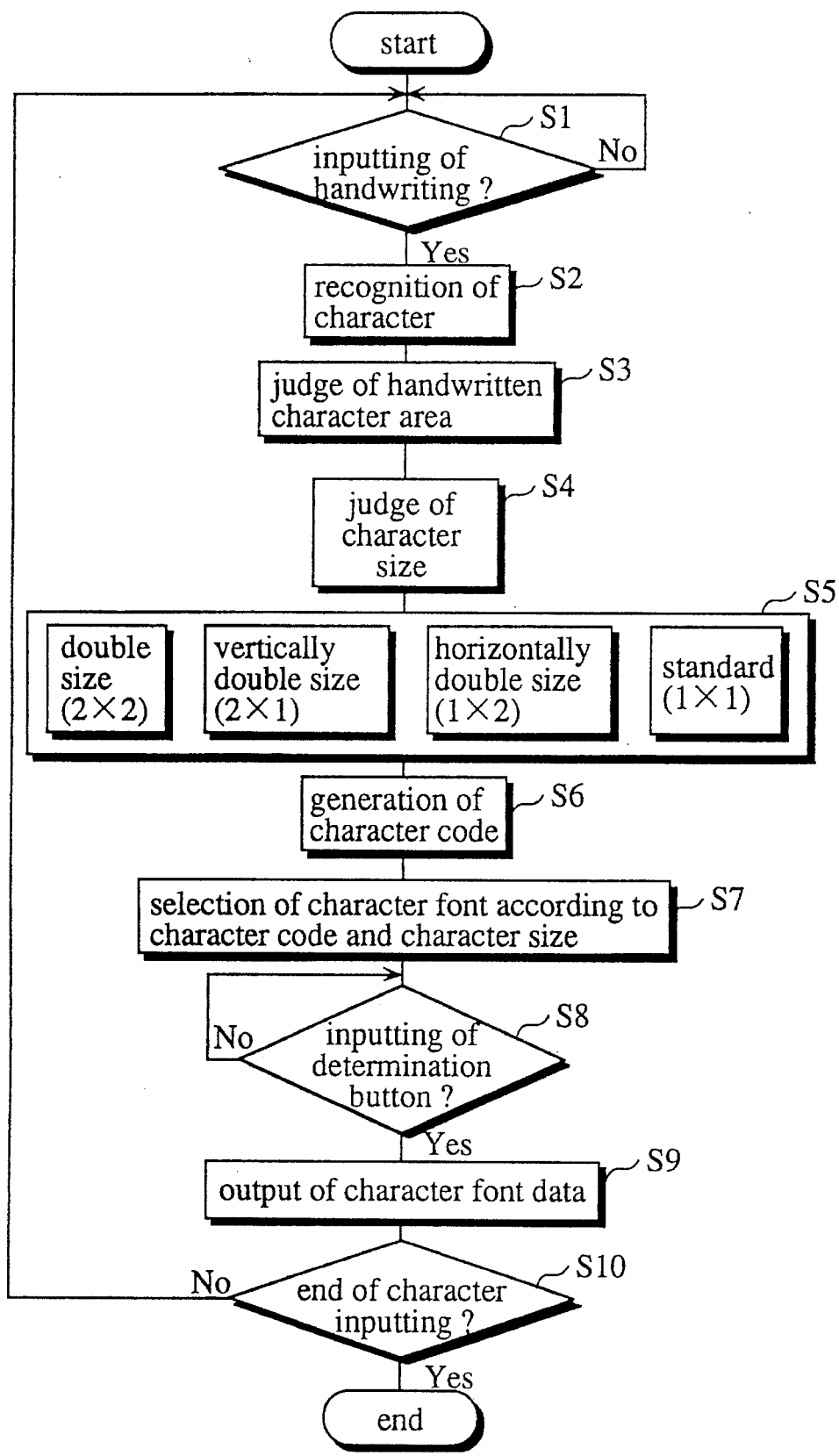
FIG. 7 is a flow chart describing input operation with the handwritten character input device of the present invention.
Figure 8:
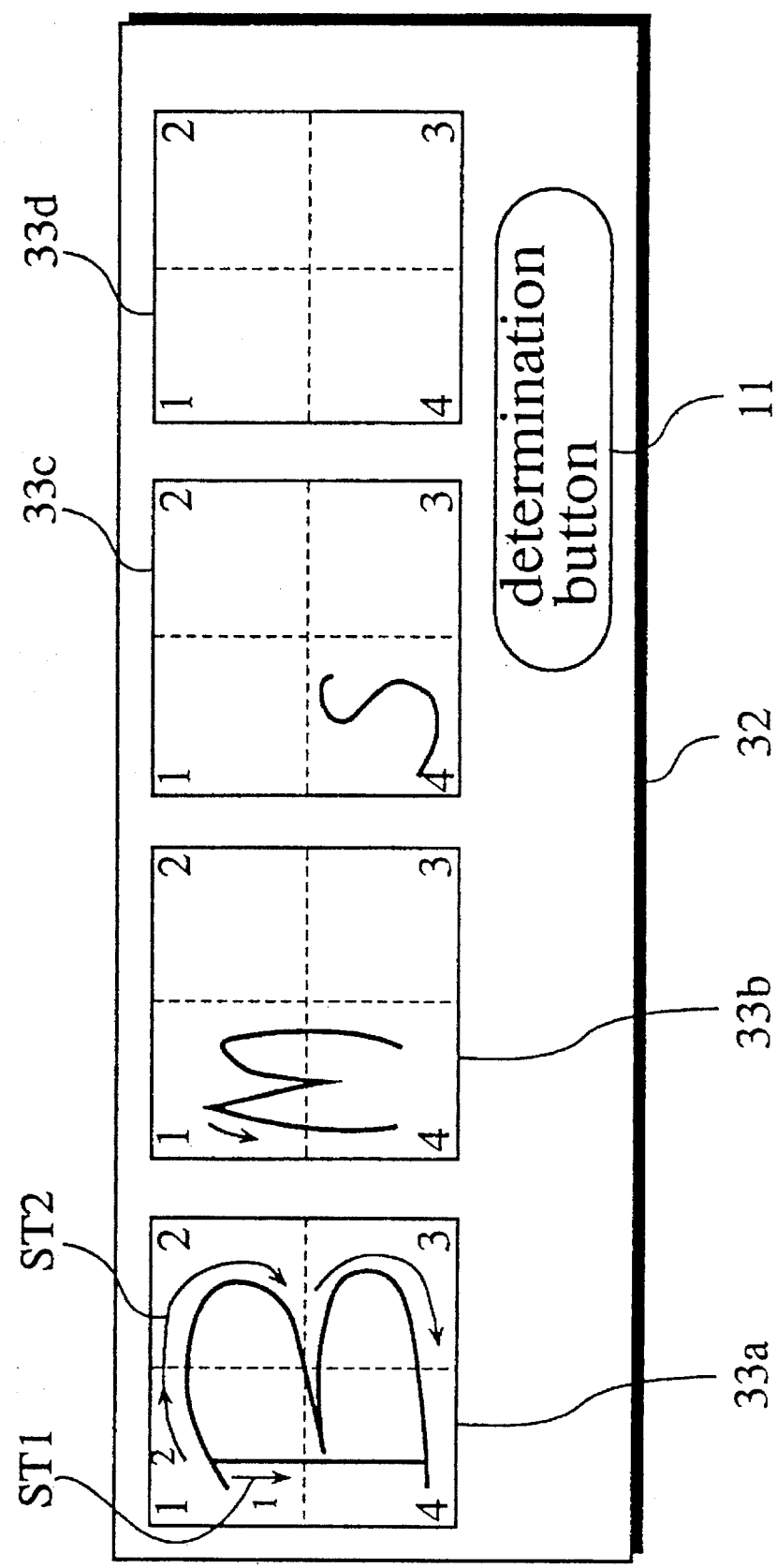
FIG. 8 shows an exemplary operation of the inputting of characters to a word processor with the handwritten character input device of the present invention.

The inputting of handwritten characters is described now as referring to FIG. 7. First, the operator inputs desired characters within the single character input areas 33a–33d (S1). FIG. 8 shows an example of handwritten characters. For convenience of the description, three characters in different sizes are inputted consecutively in FIG. 8; however, generally handwritten characters are recognized one character at a time.

The table plate 10a converts the handwriting into coordinate data, and provides the data to the handwritten area determination unit 3 and the handwritten character recognition unit 2.

The handwritten character recognition unit 2 recognizes what character is represented by the received coordinate data (hereunder referred to as stroke data). A number of methods have been applied to recognize a character according to the stroke data; and any one of these methods can be employed in this embodiment (S2).

When receiving the stroke data from the table plate 10a, the handwritten area judge unit 3 recognizes the size of the inputted handwritten character. This recognition is described as referring to FIG. 8. When receiving the stroke data ST1 and ST2 for the character B within the character area 33a one at a time, a character area judge unit 3a judges which of divided areas 1–4 is placed each stroke data, and sets flag "1" to the divided area where the stroke data is included. For example, the character "B" in the figure passes though all of the divided areas 1–4; accordingly, the flag "1" is set to all of the divided areas 1–4. Similarly, the flag "1" is set to the divided areas 1 and 4 in the case of character "M" in the figure, and the flag "1" is set only to the divided area 4 in case of character "s" in the figure (S3).

Also, the character area judge unit 3a includes a character size judge table in FIG. 10. The character area judge unit 3a selects the character size which corresponds to area data by applying the area data to the character size judge table. For example, double size (2×2), vertically double size (2×1), and standard (1×1) are applied to the above characters "B", "M", and "s" respectively. A blank area judge unit 3b sets blank areas except in that the character passes through every divided area. For example, the divided areas 2 and 3 are set as blank areas when the character "M" is inputted at vertically double size, and the divided area 3 is set as blank area when the character "s" is inputted at standard size. The blank area information is provided to the character code generation unit 4. Then, the handwritten character area judge unit 3 provides the character size information to the character font determination unit 5 (S4, S5).

The character code generation unit 4 generates a character code in accordance with the recognized character and the blank area. When generating the character code, the character code generation unit 4 refers to a character code table or the like which stores relations between the stroke data and the respective character code (S6).

Figure 11:
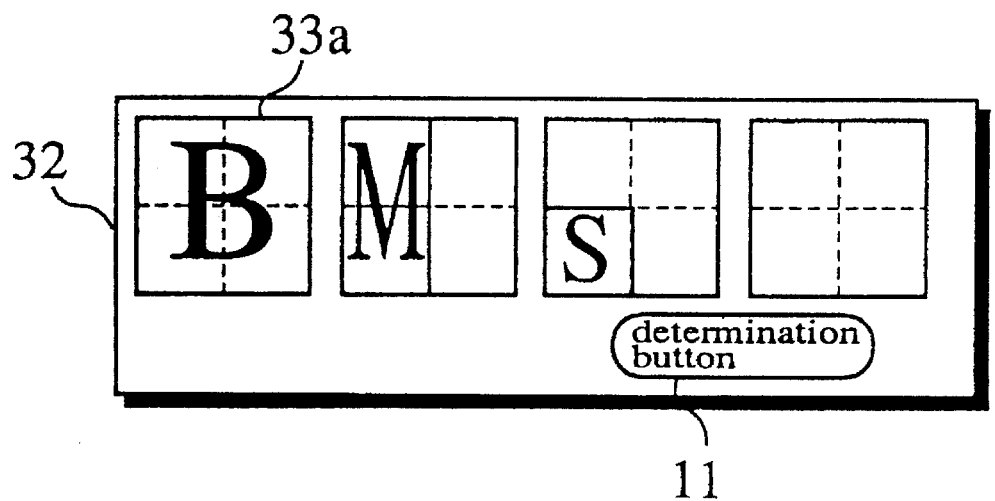
FIG. 11 shows an exemplary operation of the inputting characters to a word processor with the handwritten character input device of the present invention.

The character font determination unit 5 receives the character code data and the character size data from the character code generation unit 4 and the handwritten area judge unit 3 respectively. The character font determination unit 5 detects font data from the font data storage (font ROM) 40 which corresponds to the character code and the character size data, and extracts the font data. The display device 30 receives the extracted font data, and displays the data within the sub-window 32. FIG. 11 shows this displaying state (S7).

The operator's determination operation is awaited. If the operator presses the determination button 11, or inputs a handwritten character to the next character input area, the recognized character is determined (S8).

Figure 12:
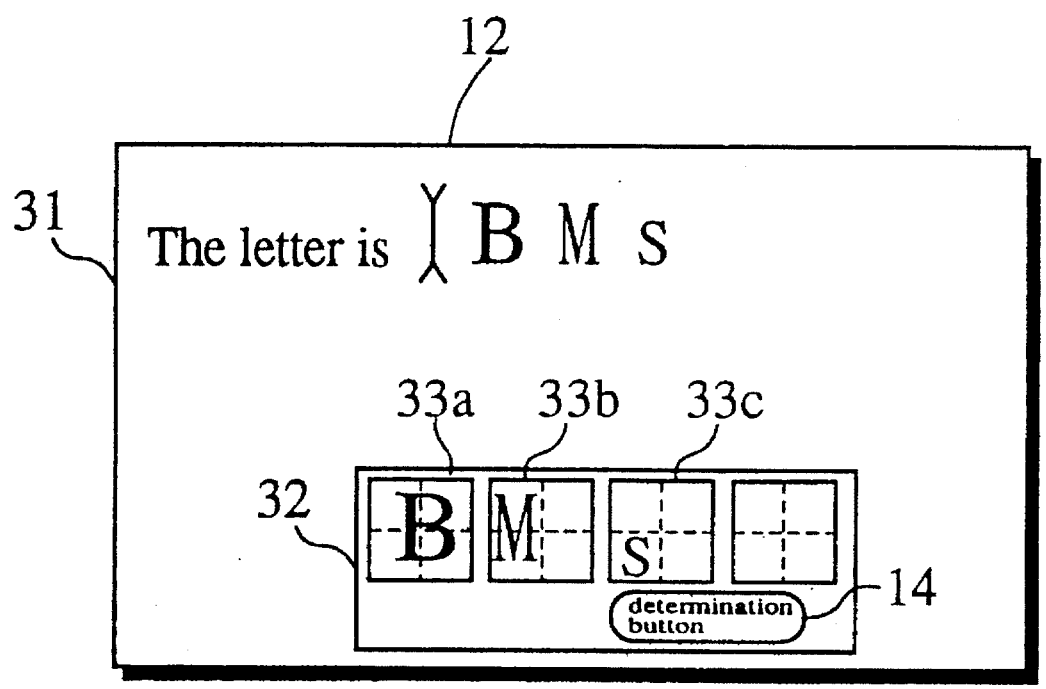
FIG. 12 shows an exemplary operation of the inputting of characters to a word processor with the handwritten character input device of the present invention.

Once the inputted character is determined, the recognized character is displayed at a location designated by a cursor 12 in the main window 31. FIG. 12 shows this display state (S9).

These operations are repeated until the inputting to these character input areas is completed (S10).

Although in the above embodiment the minimum divided area corresponds to the standard font, this setting of divided areas can vary depending on various needs. For example, when inputting Japanese characters, the minimum divided area corresponds to the size of a Japanese contracted sound. Also, the number of the divided areas may be set to be applicable from standard size to multiple size.

Also in the above embodiment, blank areas are inputted after the inputting of each character except for double size, this inputting of blank areas may be omitted. Furthermore, the operation mode of the blank area judge unit 3b can be optional.

Also, the user can select either the mode for changing the character font in accordance with the size of the handwriting or the mode for applying only the standard font regardless of the handwriting.

Further, the font information can be increased or changed easily simply by increasing or changing the font ROM. The font information can be stored in a memory as a font file.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A handwritten character input device comprising:

an input means for inputting coordinate data which represents an operator's handwriting to a preset character inputting coordinate system;

a character recognition means for recognizing a character from the handwriting according to the coordinate data, and generating a character code corresponding to the recognized character;

a character size determination means for determining a size of the character according to a range of the handwriting in the character inputting coordinate system by generating a plurality of predetermined divided areas in the character inputting coordinate system and determining the character size by detecting a range of divided areas which have been passed through by the handwritten character, the character size determination means generates the divided areas by dividing a character inputting area for a single character, and assigns a range of the divided areas to a standard character size; and a character font generation means for generating a character font according to the character code generated by the character recognition means and the character size determined by the character size determination means, including a font data storage for storing character font data which corresponds to the character code and the character size, defined by a predetermined range of the divided areas.

2. The handwritten character input device of claim 1, wherein the character size determination means assigns a minimum range of the divided areas to the standard character size.

3. The handwritten character input device of claim 2, wherein the character size determination means comprises a blank area judge means for judging the divided areas in the character inputting area for a single character where the handwriting does not pass through as a blank area.

4. The handwritten character input device of claim 3, wherein the input means comprises a pen with which the operator handwrites characters and a tablet for converting the handwriting with the pen into coordinate data.

5. A handwritten character input device comprising:

input means, provided with a character inputting area for detecting coordinate data representing an operator's handwriting on said character inputting area;

character recognition means for recognizing a character based on said detected coordinate data to generate a character code;

handwritten area detection means for dividing said character inputting area lengthwise and crosswise into a set of divided areas to detect all the divided areas on which said handwriting passes;

handwritten character-shape recognition means for recognizing a shape of an input character of said handwriting using the number of the divided areas detected by said handwritten area detection means and an alignment direction thereof;

character font storage means for storing a plurality of character fonts for any combination of the character code and character shape; and character font selection means for selecting an adequate character font from said character font storage means for a combination of said character code generated by said character recognition means and the shape of said input character recognized by said handwritten character-shape recognition means.

6. A handwritten character input device comprising:

input means, provided with a character inputting area for detecting coordinate data representing an operator's handwriting on said character inputting area;

character recognition means for recognizing a character based on said detected coordinate data to generate a character code;

handwritten area detection means for dividing said character inputting area lengthwise and crosswise into a set of four sections on which said handwriting is inscribed;

handwritten character-shape recognition means for recognizing a shape of an input character of said handwriting using the number of the sections detected by said handwritten area detection means and an alignment direction thereof, said handwritten character-shape recognition means recognizes the shape of said input character to be:

(a) a standard size when one section is detected by said handwritten area detection means;

(b) a vertically-double size when two vertically adjacent sections are detected;

(c) a horizontally-double size when two horizontally adjacent sections are detected; and (d) a double size when all four sections are detected;

character font storage means for storing a plurality of character fonts for any combination of the character code and character shape; and character font selection means for selecting a character font from said character font storage means for a combination of said character code generated by said character recognition means and the shape of said input character recognized by said handwritten character-shape recognition means.

7. A handwritten character input device comprising:

an input device to permit the inscription of a character by an operator on a defined area, the input device generating corresponding data representative of the inscribed character relative to a plurality of predetermined sections of the defined area that are segregated in a two-dimensional coordinate system;

a character recognition means for recognizing a shape of an input character independent of the number of sections that are inscribed upon and generating a character code corresponding to the recognized character;

a character size determination means for determining the size of the character based upon the number of predetermined sections that have been inscribed upon by the character;

character font storage means for storing a plurality of character fonts for any combination of character code and character size, including different sizes of the same character; and character font selection means for selecting a particular size of stored character fonts based upon the character code generated by said character recognition means and character size determination means.

8. A handwritten character input device of claim 7 wherein the character font selection means varies both the width and the height of the character based upon the determination of the character size determination means.

9. A handwritten character input device of claim 7 wherein at least four sections define the area in a vertical and horizontal coordinate system and the character size is determined to be:

(a) a standard size when one section is detected by said character size determination means;

(b) a vertically-double size when two vertically adjacent sections are detected;

(c) a horizontally-double size when two horizontally adjacent sections are detected; and (d) a double size when two vertically adjacent sections and two horizontally adjacent sections are detected.

10. A handwritten character input device comprising:

an input means for inputting coordinate data which represents an operator's handwriting to a preset character inputting coordinate system;

a character recognition means for recognizing a character from the handwriting according to the coordinate data, and generating a character code corresponding to the recognized character;

a character size determination means for determining a size of the character according to a range of the handwriting in the character inputting coordinate system by generating a plurality of sections of a predetermined divided area in the character inputting coordinate system and determining the character size by detecting the number of sections which have been passed through by the handwritten character, the character size determination means generates the sections by dividing the character inputting area for a single character, and assigns a predetermined number of sections to a standard character size and other predetermined numbers of sections to character sizes other than a standard character size; and a character font generation means for generating a character font according to the character code generated by the character recognition means and the character size determined by the character size determination means, including a font data storage for storing character font data which corresponds to the character code and the character size, defined by a predetermined range of the divided areas, the stored character font data includes the same characters in separate different size fonts.

* * * * *